(12) United States Patent
Chen

(10) Patent No.: US 6,926,402 B1
(45) Date of Patent: Aug. 9, 2005

(54) THREE PIECES COMBINATIVE EYEGLASSES

(76) Inventor: Lee-Tsung Chen, P.O. Box 697, Fongyuan City, Taichung County (TW), 420

( * ) Notice: Subject to any disclaimer, the term of this patent is extended or adjusted under 35 U.S.C. 154(b) by 8 days.

(21) Appl. No.: 10/856,856

(22) Filed: Jun. 1, 2004

(51) Int. Cl.[7] .................................................. G02C 9/00
(52) U.S. Cl. .......................................... 351/47; 351/57
(58) Field of Search ............................ 351/47, 48, 57, 351/58

(56) References Cited

U.S. PATENT DOCUMENTS 6,354,703 B1 * 3/2002 Sadler ......................... 351/57

* cited by examiner

*Primary Examiner*—Huy Mai

(57) ABSTRACT

A three piece combinative eyeglasses includes an ordinary nearsighted eyeglasses which is composed of a rimed lenses connected by a bridge and a pair of skull temples, a mediate fastener having a horizontal groove in back side engaged with the bridge of the glasses, a pair of circular recesses formed spaced apart in the front side for embedding a pair of magnets respectively and a positioning concave in the central top, a sunglass having a pair of glasses connected by a bridge which has a pair of magnets embedded spaced apart in back side engaged with the magnets of the mediate fastener and a horizontal positioning piece projected backward from the central back side of the bridge engaged with the magnets of the mediate fastener.

5 Claims, 10 Drawing Sheets

THREE PIECES COMBINATIVE EYEGLASSES

BACKGROUND OF THE INVENTION

The present invention relates to optical articles and more particularly to the three pieces combinative eyeglasses.

The eyeglasses are helpful to those people who have eyesight problems. Both of the nearsightedness and the farsightedness need an eyeglasses which not only improves their eyesight's problems and protect their eyes from against the strong light and/or the ultraviolet rays but also beautifies their faces. Some people are used to wear a sunglass when go outdoor under sunny day to protect their eyes from the sunshine.

Typical prior art attachable sunglass usually has a pair of magnets inlaid in two lateral sides of its bridge and projection. So that the eyeglasses of the nearsightedness must have corresponding magnets inlaid a pair rectangular grooves aside the bridge unless it couldn't attract the attachable sunglass.

Another structure of the prior art attachable sunglass has a pair of magnets at the outer circumferences of the rim and a hook at the bridge. So that the eyeglasses of nearsightedness must have the same structure and the corresponding magnets to consist with the sunglass and to enable the sunglass to be attached. Therefore, the above discussed two types of attachable sunglasses have the same disadvantage that they couldn't attach to an ordinary structured eyeglasses.

SUMMARY OF THE PRESENT INVENTION

The present invention has a main object to provide three pieces combinative eyeglasses in which the attachable sunglass is capable of attaching to any specification of the eyeglasses so the wearer of the nearsighted eyeglasses needs not to buy a new structured eyeglasses.

Another object of the present invention is to provide three pieces combinable eyeglasses in which the bridge of the eyeglasses holds a fastener which attracts a sunglass at front of the eyeglasses. The fastener has large volume to inlaid big sized magnets which provides strong attraction for attaching a sunglass and keeps a uniform beautification.

Accordingly, the three pieces combinative eyeglasses of the present invention comprises generally a nearsighted eyeglasses having a bridge, a pair of focus glasses and a pair of skull temples, a sunglass having a bridge and a pair of glasses, it is characterized in that a fastener having horizontal groove in back side which is elastically clamped on the bridge of the eyeglasses and a pair of magnets inlaid in front side made in registry with the corresponding magnets in the bridge of the sunglass so that the eyeglasses is capable of attaching any type of sunglass that the wearer has not to by a new eyeglasses to coinside with the attachable sunglass.

The present invention will become more fully understood by reference to the following detailed description thereof when read in conjunction with the attached drawings.

DETAILED DESCRIPTION OF THE PREFERRED EMBODIMENT

Figure 1:
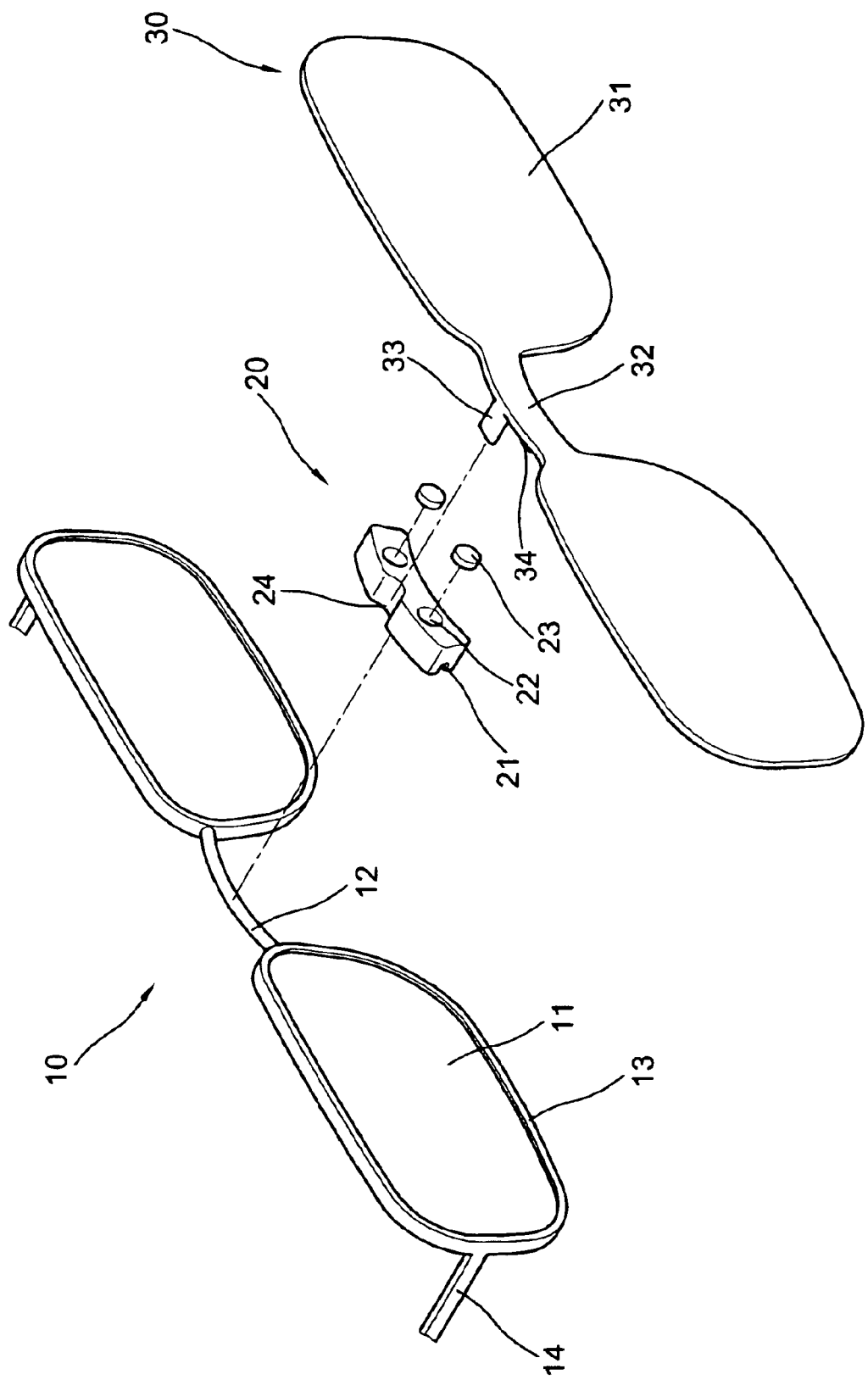
FIG. 1 is an exploded perspective view of a first embodiment of the three pieces combinative eyeglasses according to the present invention.
Figure 2:
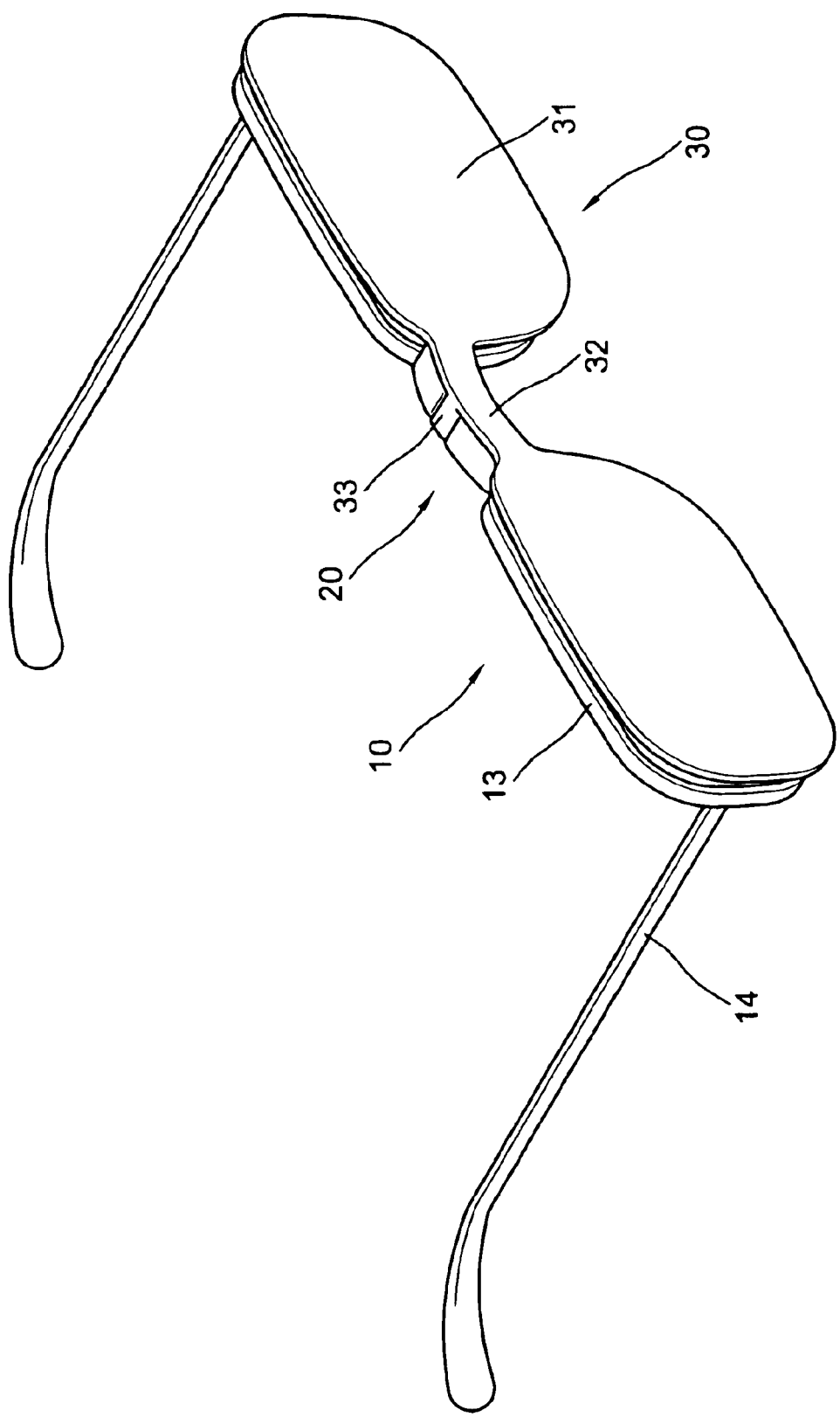
FIG. 2 is a perspective view to show the combination of FIG. 1.
Figure 3:
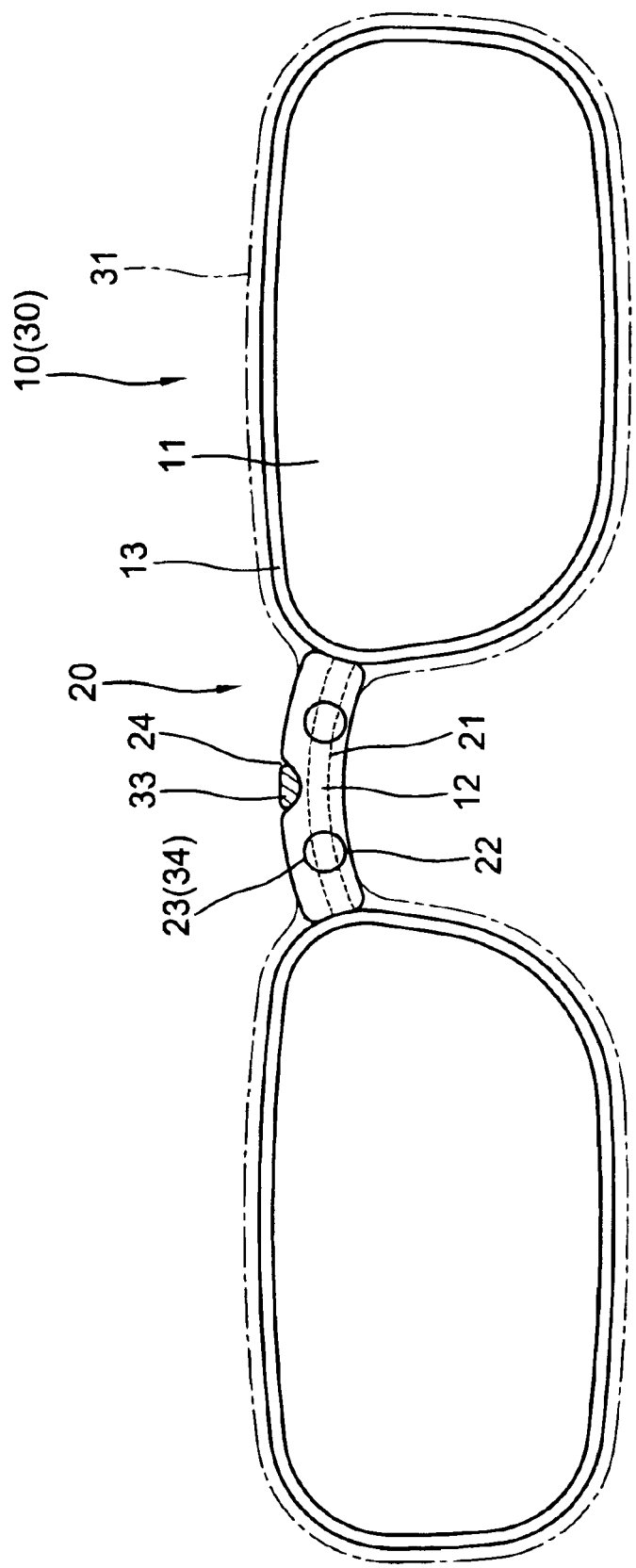
FIG. 3 is a plane view with partially sectional view of FIG. 1.
Figure 4:
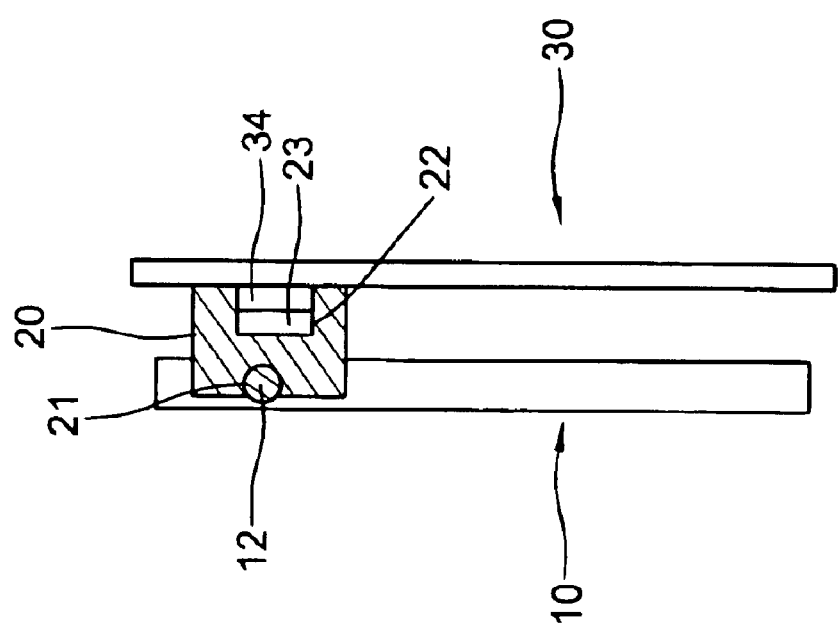
FIG. 4 is a sectional view of FIG. 2 looking toward a lateral side thereof.

With reference to FIGS. 1 to 4 of the drawings, the first embodiment of the three pieces combinative eyeglasses of the present invention comprises an ordinary nearsighted eyeglasses 10, a mediate fastener 20 and a sunglass 30.

The ordinary nearsighted eyeglasses 10 has a pair of lenses 11, a bridge 12 a pair of rims 13 and a pair of skull temples 14.

The mediate fastener 20 has a horizontal groove 21 in back side which has a narrow opening and a wide interior portion engageable with the bridge 12 of the eyeglasses 10 and elastically clamps the bridge 12, a pair of circular recesses 22 spacedly formed in front side engaged with a pair of circular magnets 23 therein and a positioning concave 24 centrally formed in the top thereof.

The sunglass 30 has a pair of rimless colored 31 connected by a bridge 32, a horizontal positioning piece 33 centrally projected inward from the back side of the bridge 32 engaged with the positioning concave 24 of the mediate fastener 20 and a pair of corresponding magnets 34 spacedly disposed in the back side of the bridge 32 engaged with and attracted by the pair of circular magnets 23 of the mediate fastener 20.

Upon the above discussed structure and combination, the magnets 23 and 34 in addition to the positioning piece 33, the vertical and the horizontal component of forces of the sunglass 30 and the downward force caused by the weight of the sunglass are totally shared and the combination is reliable.

When disassembling, remove the sunglass 30 from the mediate fastener 20 or remove both the sunglass 30 and mediate fastener 20 that is very convenient.

The disclosure of the three pieces combinative eyeglasses of the present invention aims principally to solve the problem caused by the prior art two pieces combinative eyeglasses for which the customer has to buy a new eyeglasses in corporation with a sunglass. This would be cost the customer more. But three piece combinative eyeglasses of the present invention does not need to buy a new eyeglasses but just buy a similar sized sunglass 30 and a suitable mediate fastener 20 that the problem is solved. The producer of the eyeglasses provides the different sized sunglass 30 and the suitable mediate fastener 20 to satisfy the requirement in the market. This is the feature of the present invention. Further, the mediate fastener 20 may be modified to clamp the top, the front, the underside or the back of the bridge 12 of the ordinary nearsighted eyeglasses 10 and sunglass 30 is capable of coincidence this modification which belongs to the scope of the present invention.

Figure 5:
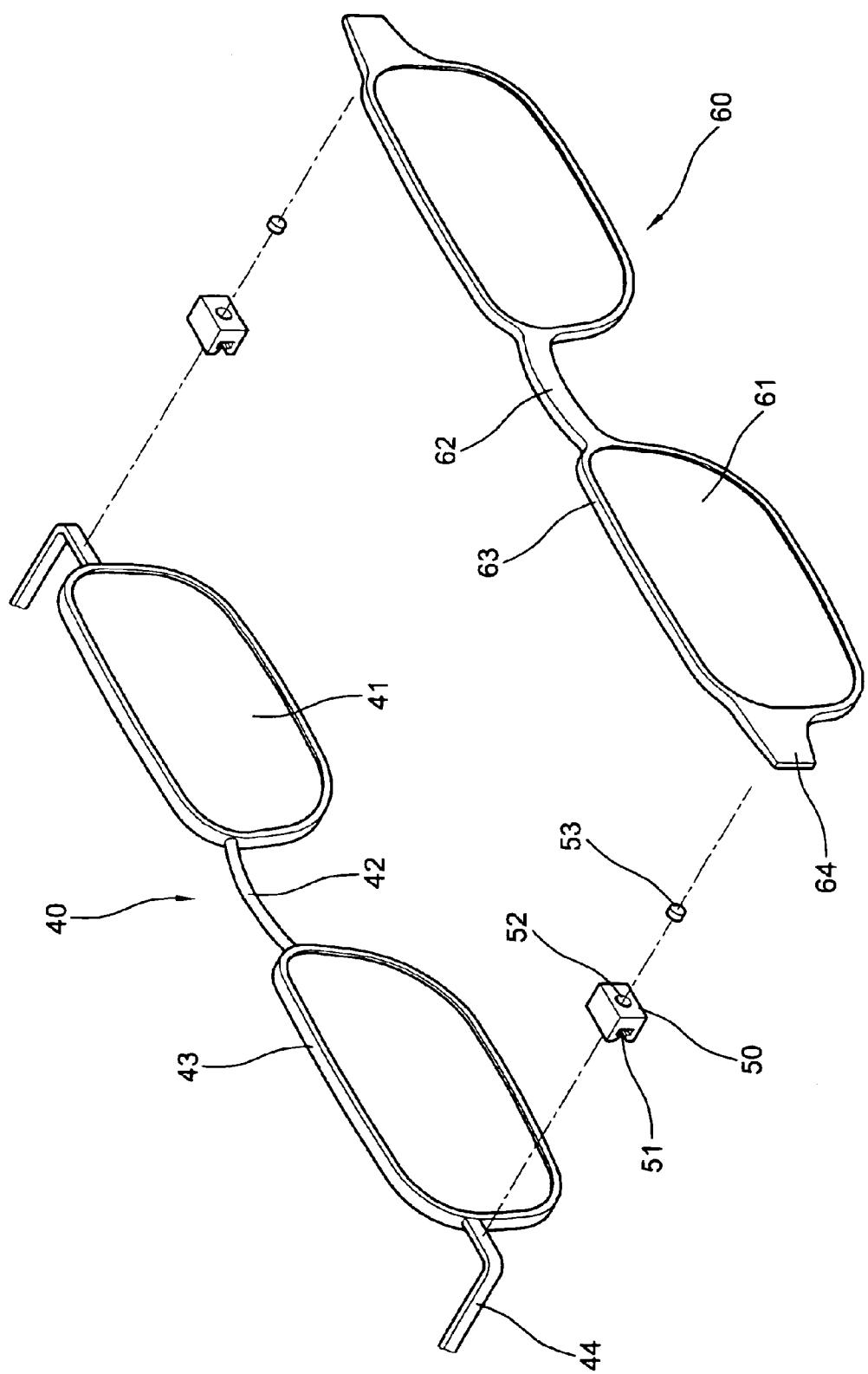
FIG. 5 is an exploded perspective view of a second embodiment of the three pieces combinative eyeglasses according to the present invention.
Figure 6:
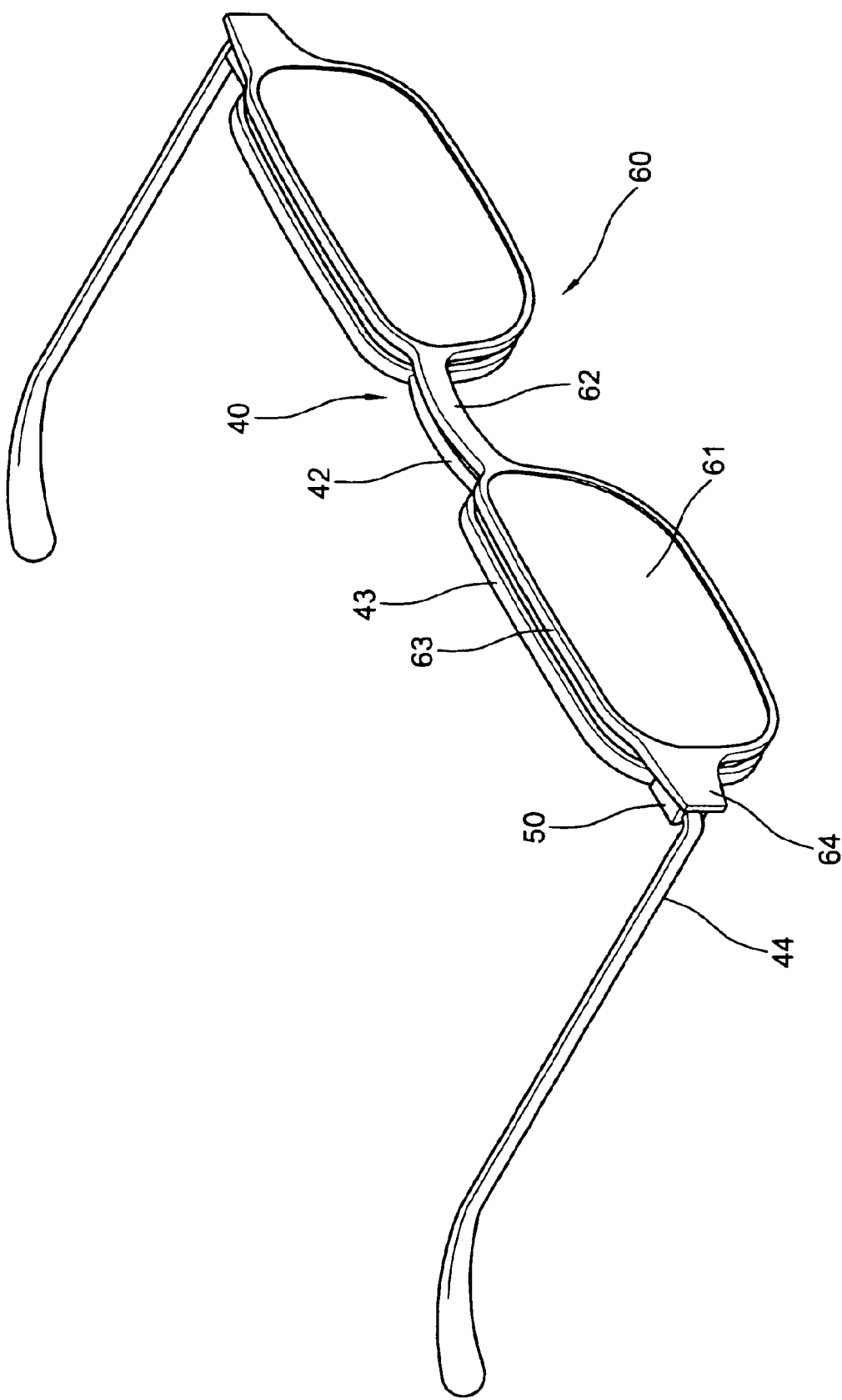
FIG. 6 is a perspective view to show the combination of FIG. 5.
Figure 7:
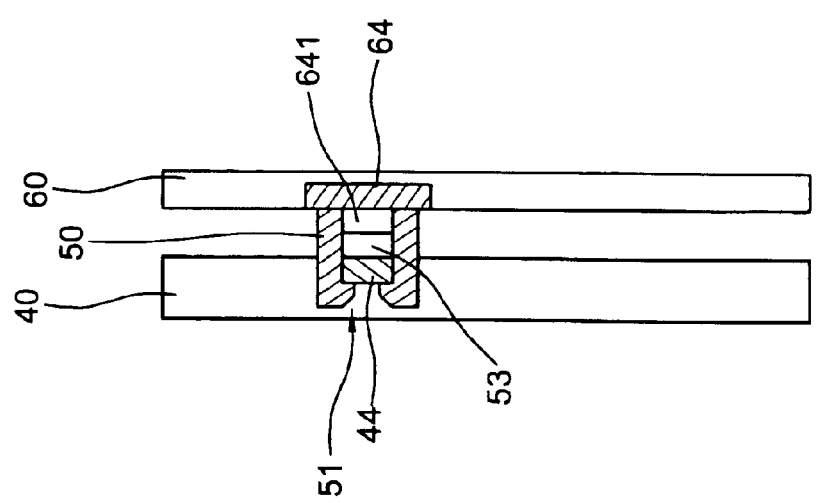
FIG. 7 is a sectional view of FIG. 6 looking toward a lateral side thereof.
Figure 8:
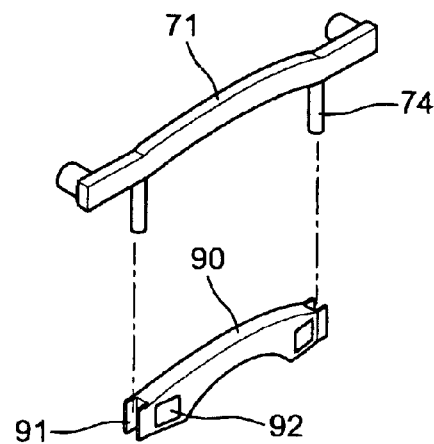
FIGS. 8 and 9 are the exploded perspective views of a third embodiment of the three pieces combinative eyeglasses according to the present invention.
Figure 9:
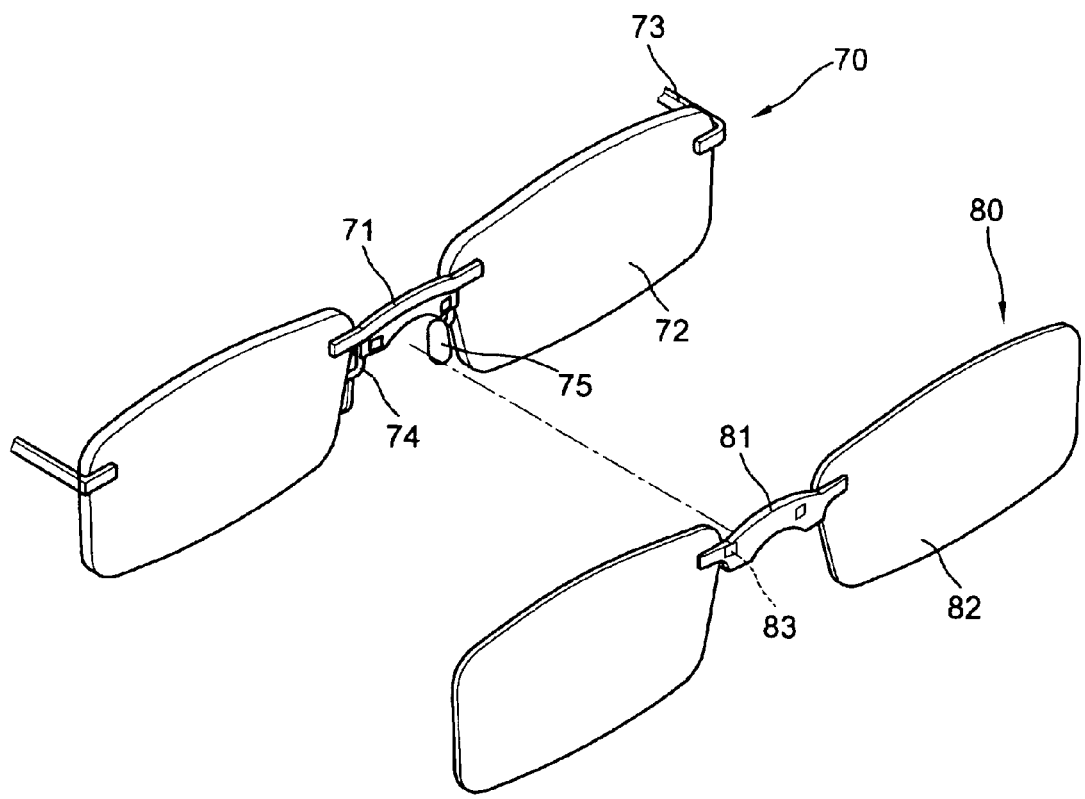
Figure 10:
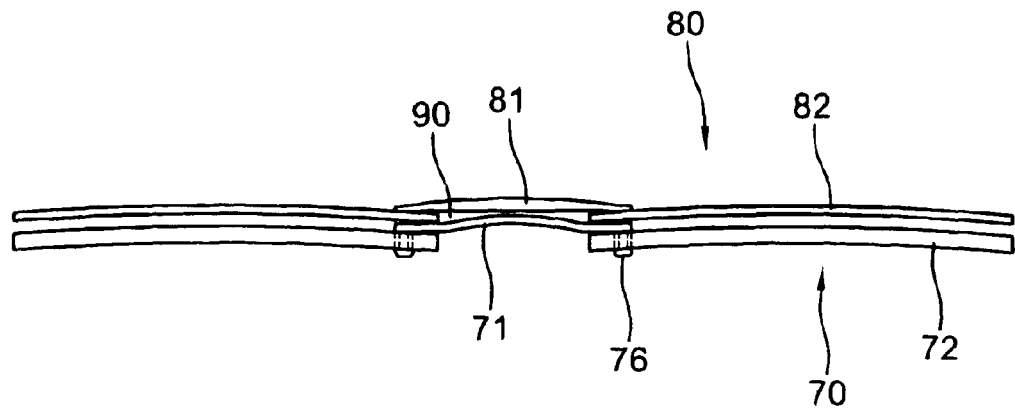
FIG. 10 is a top view of the combination of the third embodiment.
Figure 11:
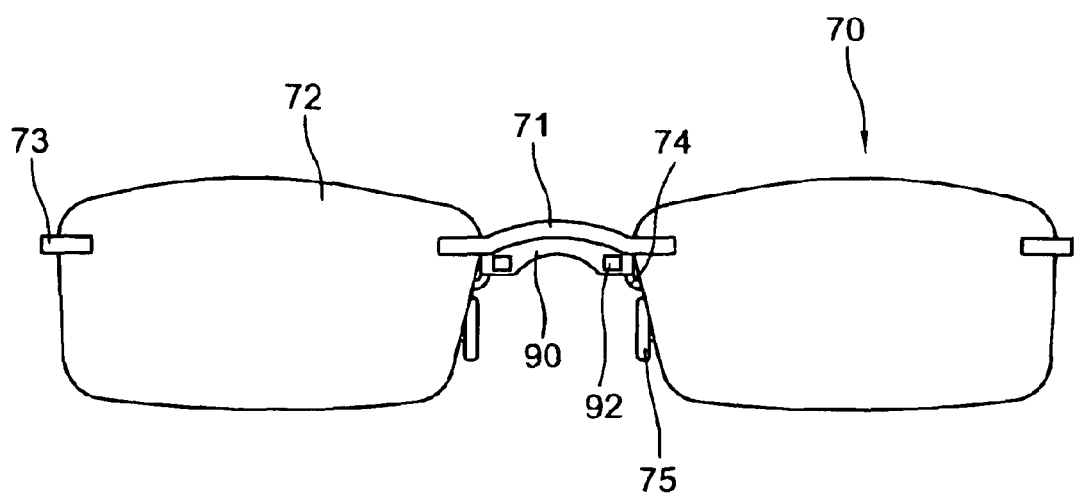
FIG. 11 is an elevational view to show the structure of the eyeglasses of the third embodiment.
Figure 12:
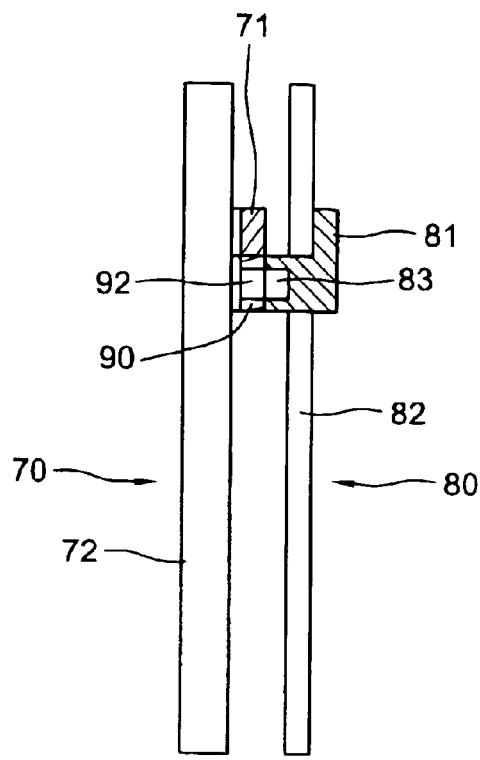
FIG. 12 is a sectional view to show the combination of the third embodiment looking toward a lateral side.
Figure 13:
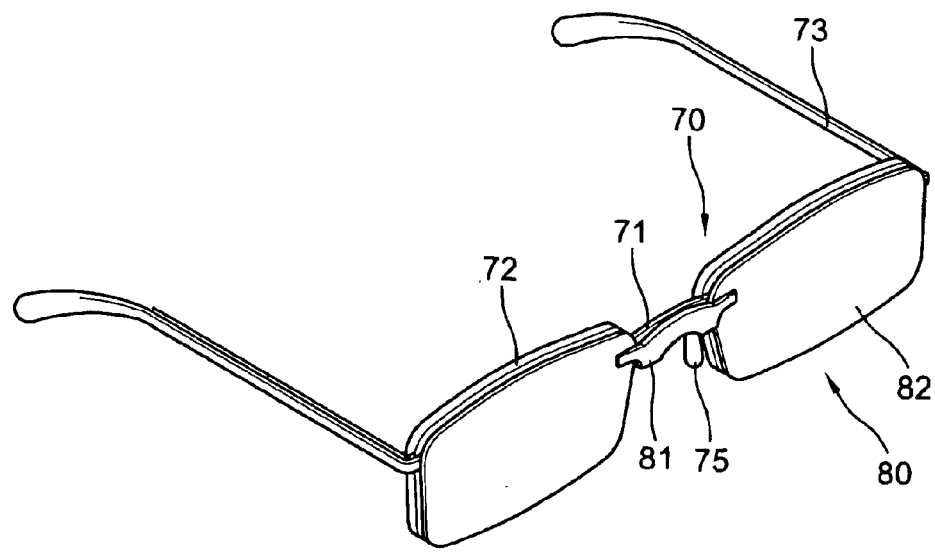
FIG. 13 is a perspective view to show the combination of the third embodiment.

Referring to FIGS. 5, 6 and 7, a second embodiment of the three pieces combinative eyeglasses of the present invention is shown. This embodiment comprises an ordinary nearsighted eyeglasses 40, a pair of mediate fasteners 50 and a sunglass 60.

The ordinary nearsighted eyeglasses 40 has a pair lenses 41, a pair of rims 43 fixing the lenses 41, a bridge 42 connected the rims 43 and a pair of L-shaped skull temples 44 on the outer sides of the two rims 43.

The two mediate fasteners 50 each has a horizontal groove 51 in the back side which has a narrow opening and a wide interior portion and elastically clamps the transverse portions of the L-shaped skull temples 44 of the ordinary nearsighted eyeglasses 40, and a circular recess 52 in the front side engaged within a circular magnet 53.

The sunglass 60 has a pair of colored sunglasses 61 fixed into a pair of rims 63 and connected by a bridge 62 and a pair of projections 64 extended outward from the upper outer peripheries of the rims 63 each of which has a corresponding circular magnets 641 in the back side engaged with and attracted by the circular magnets 53 (as shown in FIG. 7).

This embodiment suit to the eyeglasses 40 having pair of L-shaped skull temples. The vertical and/or the horizontal component forces of the sunglasses may be evenly shared by two mediate fasteners.

Referring to FIGS. 8 to 12 of the drawings, a third embodiment of the three pieces combinative eyeglasses is provided. This embodiment comprises an ordinary nearsighted eyeglasses 70, a sunglass 80 and slender fastener 90.

The ordinary nearsighted eyeglasses 70 has a pair of rimless lenses 72 connected by a bridge 71 with screws 76, a pair of skull temples 73 and a pair of pad arms 74 for supporting a pair of nose pads 75.

The slender fastener 90 has a gripping groove 91 in each end engaged with the pad arms 74 of the eyeglasses 70. Due to the fastener 90 is wider than that of the bridge 71, it is capable of receiving a pair of rectangular magnets 92 in front side thereof.

The sunglass 80 has a pair rimless colored glasses 82 connected by a bridge 81 and a pair of rectangular magnets 83 spacedly embedded in the bridge 81 engaged with the rectangular magnets 92 of the slender fastener 90.

The slender fastener 90 is engaged with the pad arms 74 before the pad arms 74 are bent inward to mount the pair of nose pads 75 so that the engagement of the slender fastener should be very stable. Because of the strong attraction of the magnets 83 and 92, the attachment of the sunglass with the ordinary nearsighted eyeglasses would be very durable.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A three pieces combinative eyeglasses comprising:
   ordinary nearsighted eyeglasses having a pair of lenses secured into a pair of rims, a bridge connecting said rims and a pair of skull temples respectively connecting to a inner surface of said rims;
   a mediate fastener having a horizontal groove in back side elastically clamping the bridge of said eyeglasses, a pair of circular recesses spacedly formed in front side thereof embedded a pair of first circular magnets respectively and a concave centrally formed in the top thereof;
   a sunglass having a pair of rimless glasses connected by a bridge therebetween, a horizontal projection centrally projected backward from an inner surface of the bridge engageable with said concave of said mediate fastener and a pair of second circular magnets spacedly embedded in back side of said bridge and releasably engaged with the first circular magnets of said mediate fastener.

2. The combinative eyeglasses as recited in claim 1, wherein said horizontal groove of said mediate fastener have a narrow opening and a wide interior.

3. A three pieces combinative eyeglasses comprising:
   ordinary nearsighted eyeglasses having a pair of lenses secured into a pair of rims which are connected by a bridge and pair of L-shaped skull temples each including a transverse portion respectively connected to an outer periphery of said rims;
   a pair of mediate fasteners each having a horizontal groove in back side thereof elastically engaged with the transverse portions of the L-shaped skull temples of said ordinary nearsighted eyeglasses and a circular recess in front side for embedding a first circular magnet therein;
   a sunglass having a pair of glasses secured into a pair of rims which are connected by a bridge therebetween and a pair of projection respectively projected outward from an upper outer periphery of said rims each including a second circular magnet embedded in a backside engaged with the first circular magnets of said mediate fasteners respectively.

4. The combinative eyeglasses as recited in claim 3, wherein said pair of mediate fasteners each has a horizontal groove in back side having a narrow opening and a wide interior portion.

5. A three pieces combinative eyeglasses comprising:
   ordinary nearsighted eyeglasses having a pair of rimless lenses connected a bridge which has a pair of pad arms spacedly projected downward from underside and a pair of L-shaped skull temples respectively connected to a outer periphery of said lenses;
   a slender fastener having a wide larger than that of the bridge, a pair of gripping grooves respectively formed in two ends engaged with the pad arms of said ordinary nearsighted eyeglasses before that the pad arms are bent backward to connect with a pair of nose pads respectively and a pair of rectangular recesses spacedly formed in front side thereof for embedding a pair of firs rectangular magnets therein;
   a sunglasses having a pair of rimless colored glasses connected by a bridge which has a pair of second rectangular magnets embedded spaced apart in backside engaged with the first rectangular magnets of said slender fastener.

* * * * *